Aug. 6, 1957     A. J. JONES     2,801,499
CENTERLESS GRINDING MACHINE WITH FEED CONTROL
Filed Jan. 13, 1955     3 Sheets-Sheet 1

INVENTOR
ALVIN J. JONES

BY *Mason, Porter Diller & Stewart*

ATTORNEYS

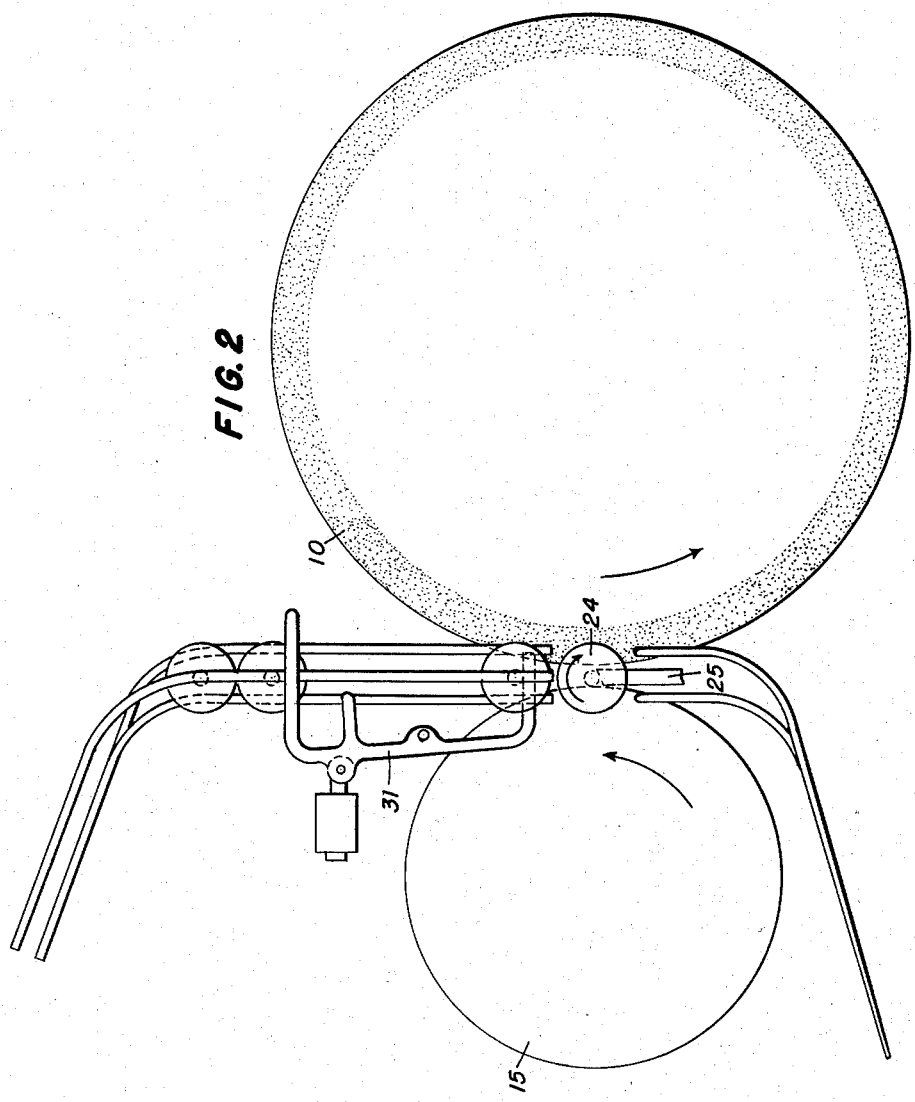

Aug. 6, 1957 A. J. JONES 2,801,499
CENTERLESS GRINDING MACHINE WITH FEED CONTROL
Filed Jan. 13, 1955 3 Sheets-Sheet 3
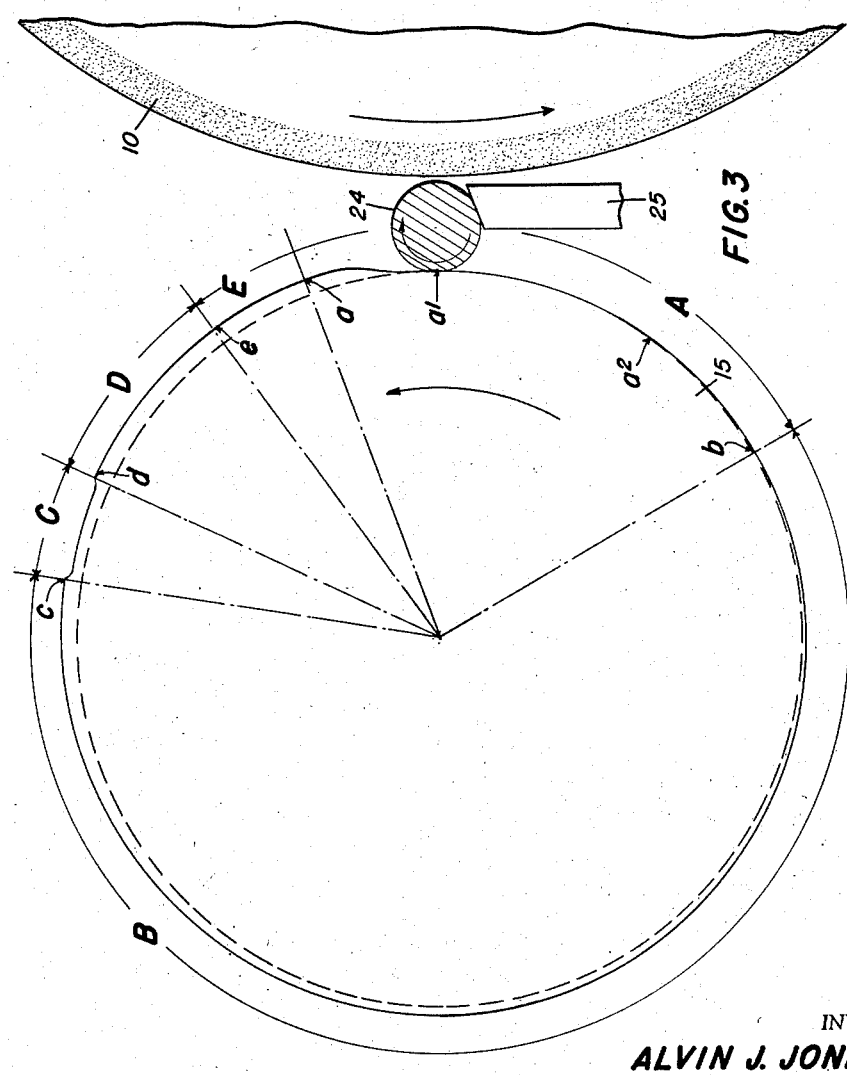
INVENTOR
ALVIN J. JONES
BY Mason, Porter, Diller & Stewart
ATTORNEYS

United States Patent Office 2,801,499
Patented Aug. 6, 1957

2,801,499

CENTERLESS GRINDING MACHINE WITH FEED CONTROL

Alvin J. Jones, Waynesboro, Pa., assignor to Landis Tool Company, Waynesboro, Pa., a corporation of Pennsylvania Application January 13, 1955, Serial No. 481,561

3 Claims. (Cl. 51—103)

This invention relates to new and useful improvements in centerless grinders wherein the control wheel is cam shaped and receives, rough grinds, finishes and discharges the workpiece in a single rotation of the control wheel.

An object of the invention is to provide the control wheel of a centerless grinder of the above type with a relief section disposed between a rough grinding section and a finish grinding section which stops the progress of the rough grinding feed and relieves the strain on the work as well as the machine for a brief interval before proceeding with the finish grinding.

In the drawings which show the preferred embodiment of the invention:

Figure 2 is a view showing more or less diagrammatically the feeding of a workpiece into grinding position and Figure 3 is a view more or less diagrammatically showing the construction of the cam surface on the control wheel and its relation to the work rest and the grinding wheel, the control wheel being shown in side elevation.

Figure 1:
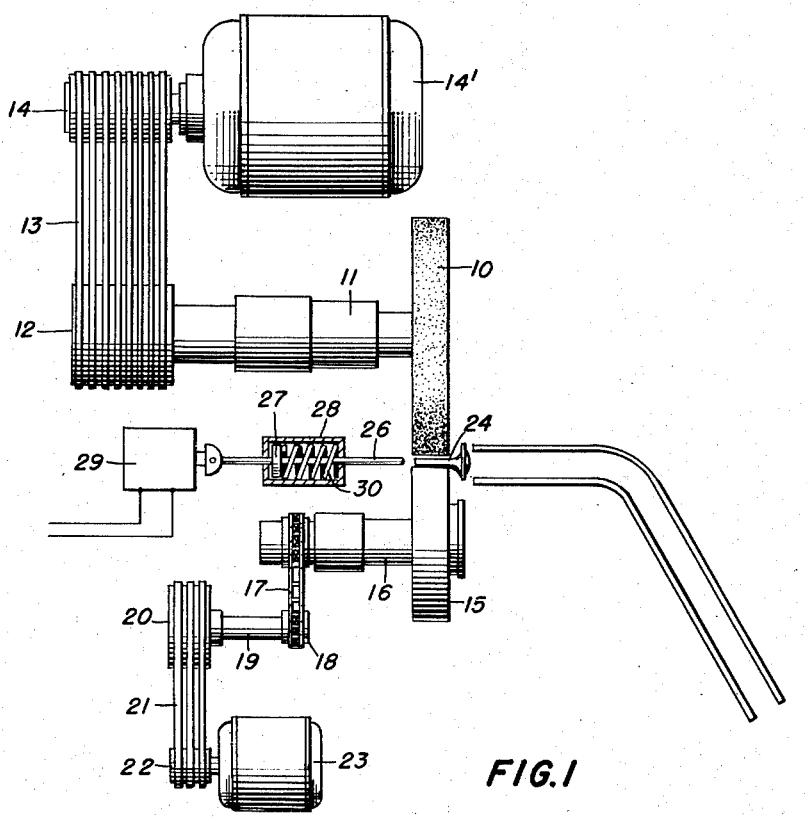
Figure 1 is a view partly in plan and partly in section showing the essential features of a grinding machine embodying the invention.

In Figure 1 of the drawings there is shown more or less diagrammatically and in plan the essentials of the centerless grinder having applied thereto the improved control wheel. The grinding wheel 10 is mounted on a spindle 11 supported in suitable bearings and carrying a multiple driving pulley 12. The spindle is rotated by belt connections 13 running over the driving pulley 14 of a motor 14'. The control wheel 15 is mounted on a spindle 16 which is mounted in suitable bearings carried by the bed of the machine and a driving chain 17 runs over a driving wheel on the spindle 16 and also over a driving wheel 18 carried by a spindle 19 mounted in suitable bearings. On the end of the spindle 19 is a multiple belt wheel 20 over which driving belts 21 runs. These belts run over a driving pulley 22 on the shaft of the motor 23.

The workpiece to be ground is indicated at 24. The machine is particularly adapted for grinding valve stems and the workpiece is so illustrated. The purpose of the intermediate shaft for transmitting motion from the motor 23 to the spindle 16 carrying the control wheel is to provide a means whereby the control wheel may be driven at a very slow speed relative to the speed of the grinding wheel.

During grinding the workpiece is supported on a work rest 25. The peripheral face of the control wheel is cam shaped and there is a section which is shaped so as to release the workpiece after it is ground so it can be discharged from the machine. This is accomplished by the plunger ejector 26 carried by a piston 27 mounted in a cylinder 28 and controlled by a solenoid 29 through a suitable timing mechanism not shown. There is a spring 30 within the cylinder 28, acting against the piston 27 and which retracts the ejector. After the work is finished the timer energizes the solenoid 29 and causes the ejector to move into engagement with the workpiece and discharge the workpiece by an endwise movement from the work rest. Practically at the same time that the work is ejected from the machine a solenoid-operated pivoted finger 31 is retracted and another work-piece is released so that it drops onto the work rest. This feeding of the workpieces to the machine and the ejecting of the same, forms no part of the present invention and further description thereof is not thought necessary.

In Figure 3 of the drawing there is shown diagrammatically and in side elevation a portion of the grinding wheel 10, the work rest 25, the workpiece 24, and the control wheel 15. The control wheel rotates about a fixed center, the peripheral cam face is indicated by the heavy line. To more clearly show the variations in the radius of the cam face there is indicated in this figure in broken lines a concentric base line.

The control wheel rotates in the direction of the arrow and when the parts are in position shown in Figure 3 the line of contact of the cam shaped periphery with the workpiece is at a minimum radius and the workpiece is therefore released so that it can be ejected from the machine. The arc portion of the control wheel indicated at A may be referred to as the loading and unloading section of the control wheel. Beginning at the point $a$, the radius of the cam shaped periphery gradually decreases to the point $a'$ where the work is completely released and from the point $a'$ to the point $a^2$ the ejecting of the finished workpiece and the loading of another workpiece for grinding takes place.

From the point $a^2$ to the point $b$ the radius of the peripheral cam surface gradually increases so that the rough grinding begins and continues throughout the arc B. During this rough grinding, material is being removed from the valve stem but the radius of the cam surface in this arc B gradually increases to compensate for the decrease in the radius of the shank of the valve stem. Therefore, a heavy rough grinding of the valve stem would begin at the point $b$ and continue until the point $c$ is reached. At the point $c$ the peripheral cam radius quickly decreases to and remains at a radius so that the normal feed of the workpiece stops. This continues throughout the arc $c$. During this period of rotation of the control wheel the workpiece is released from the strain of heavy rough grinding. This strain together with the heating of the workpiece during rough grinding is likely to cause the stem of the valve to warp slightly. The radius of the relief surface, however, is so dimensioned that during the passing of the workpiece through that section it will cause a correction of the warped condition by grinding off the out of round portions, so that when it goes into the finish grinding section substantially all of the warpage has been removed and if any remains it will be taken off during finish grinding. While the relief section is passing the workpiece the strains on the machine during rough grinding are released and the parts thereof resume their normal position ready for the finish grinding operation.

When the point $d$ reaches the workpiece the radius of the peripheral cam gradually increases so that there is a light feed of the workpiece against the grinding wheel throughout the arc D. This is the finish grinding section. During the finish grinding the stem of the valve will be reduced to its desired diameter and any warping or irregularities left after passing through the relief section will be completely removed during this finish grinding.

When the point $e$ is reached then the radius of the peripheral cam slightly decreases so that there is no feed of the workpiece for a grinding operation, but the workpiece is rotated for what is known as spark out. This spark out continues throughout the arc E. When the point $a$ reaches the workpiece then the cycle has been completed, the workpiece is finished and the peripheral cam decreases in radius so as to release the workpiece and permit the unloading of the ground piece and the loading of another piece to be ground.

The term radius as used in this description relates to the radial dimension rather than to a fixed or uniform distance of a curved surface from the center. It is preferred that the roughing and finishing portions of the control wheel, in order to provide the necessary feeding action, have a predetermined lift or rise resulting from an increase in radial dimension. However, they may also be curves of fixed radial distance which would provide a grinding throat of a width equal to the desired diameter of the work at the end of the rough or finish operations.

The loading, heavy rough grinding, the finish grinding, the spark out and unloading are all accomplished during a single rotation of the control wheel. The speed of the control wheel may be reduced during unloading and loading to give more time for this purpose without increasing the arc through which the control wheel is traveling. Likewise, the speed of the control wheel may be reduced while the control wheel is moving through the arc from $c$ to $d$ to give more time for cooling off, the recovering from the strain of rough grinding and the removal of out of round portions.

It is obvious that minor changes in the details of construction may be made without departing from the spirit of the invention as set forth in the appended claims.

I claim:

1. The combination with a centerless grinder comprising a rotary grinding wheel and a work rest, of a control wheel, said control wheel having a section of reduced radius to permit loading and discharge of workpieces, a cam section of gradually increasing radius adjacent thereto in the direction of movement toward the work rest, a relief section of reduced radius beyond said cam section and a second cam section of greater radius connecting said relief section with the first mentioned loading and discharge section.

2. The combination with a centerless grinder comprising a grinding wheel rotating on a fixed axis and a work rest opposite the periphery of the wheel, of a control wheel rotating about a fixed axis parallel to that of the grinding wheel and beyond the work rest, said control wheel having a section of reduced radius to permit loading of workpieces on the work rest and their discharge therefrom, a cam section of gradually increasing radius adjacent said first section in the direction of movement toward the work rest, a relief section of reduced radius beyond said cam section and a second cam section of gradually increasing radius greater than that of said first cam section connecting said relief section with the first mentioned loading and discharge section.

3. The combination with a centerless grinder comprising a rotary grinding wheel and a work rest, of a control wheel, said control wheel having a section of reduced radius to permit loading and discharge of workpieces, a cam section of gradually increasing radius adjacent thereto in the direction of movement toward the work rest, a relief section beyond said cam section with a radius intermediate the radii at the ends of said cam section, and a second cam section of greater radius than said first cam section connecting said relief section with the first mentioned loading and discharge section.

References Cited in the file of this patent

UNITED STATES PATENTS

| | | |
|---|---|---|
| 1,850,054 | Strickland et al. | Mar. 15, 1932 |
| 2,006,570 | Haas | July 2, 1935 |
| 2,025,714 | Binns | Dec. 31, 1935 |
| 2,557,248 | Appel et al. | June 19, 1951 |
| 2,571,610 | Price | Oct. 16, 1951 |